US011524318B2

(12) United States Patent
Shrout

(10) Patent No.: US 11,524,318 B2
(45) Date of Patent: Dec. 13, 2022

(54) METHOD AND SYSTEM FOR MARKING AND ENCODING RECYCLABILITY OF MATERIAL TO ENABLE AUTOMATED SORTING OF RECYCLED ITEMS

(71) Applicant: Michael David Shrout, St. George, UT (US)

(72) Inventor: Michael David Shrout, St. George, UT (US)

( * ) Notice: Subject to any disclaimer, the term of this patent is extended or adjusted under 35 U.S.C. 154(b) by 13 days.

(21) Appl. No.: 17/171,111

(22) Filed: Feb. 9, 2021

(65) Prior Publication Data

US 2021/0170451 A1  Jun. 10, 2021

Related U.S. Application Data

(63) Continuation-in-part of application No. 16/945,629, filed on Jul. 31, 2020, now abandoned.

(60) Provisional application No. 62/880,932, filed on Jul. 31, 2019.

(51) Int. Cl.
*B07C 5/34* (2006.01)
*G06Q 10/00* (2012.01)
*G06V 20/10* (2022.01)

(52) U.S. Cl.
CPC .......... *B07C 5/3412* (2013.01); *G06Q 10/30* (2013.01); *G06V 20/10* (2022.01); *B07C 2501/0054* (2013.01)

(58) Field of Classification Search
CPC .......... B07C 5/3412; B07C 2501/0054; B07C 2501/0063; B07C 5/10; G06Q 10/30
See application file for complete search history.

(56) References Cited

U.S. PATENT DOCUMENTS

| | | | |
|---|---|---|---|
| 5,615,778 A * | 4/1997 | Kaiser | B07C 5/34 209/939 |
| 6,353,197 B1 * | 3/2002 | Ulrichsen | B07C 5/342 250/225 |
| 6,588,600 B1 * | 7/2003 | Herborn | B07C 5/362 209/583 |
| 2013/0344297 A1 * | 12/2013 | Ackley | B07C 5/3412 356/402 |
| 2014/0084089 A1 * | 3/2014 | Laney | G01N 21/59 40/310 |
| 2018/0345323 A1 * | 12/2018 | Kerver | G06K 19/06037 |
| 2019/0131013 A1 * | 5/2019 | Kelkar | G16H 40/20 |

* cited by examiner

*Primary Examiner* — Michael McCullough
*Assistant Examiner* — Jessica L Burkman
(74) *Attorney, Agent, or Firm* — Gurr Brande & Spendlove, PLLC; Robert A. Gurr

(57) ABSTRACT

A method and system for marking and encoding recyclability includes material identification markers to enable a robot with computer vision capability to properly identify and distinguish between various materials. The material identification markers could include marks or symbols to describe a recyclable item or material. The material identification markers may be incorporated into the design of the item, printed on the item or label, or placed in any other way as this is a vision-based system. Further, the material identification markers may be visible or invisible to the human eye.

4 Claims, 12 Drawing Sheets

METHOD AND SYSTEM FOR MARKING AND ENCODING RECYCLABILITY OF MATERIAL TO ENABLE AUTOMATED SORTING OF RECYCLED ITEMS

CROSS-REFERENCE TO RELATED APPLICATIONS

This application is a continuation-in-part of U.S. patent application Ser. No. 16/945,629, filed on Jul. 31, 2020, which claims the benefit of U.S. Provisional Application Ser. No. 62/880,932, filed on Jul. 31, 2019, both of which are incorporated herein by reference.

TECHNICAL FIELD

The present disclosure relates to recycling post-consumer waste. More particularly, the present disclosure relates to a method of marking recyclable material to enable automated sorting, and, more generally, to the detection, identification, and sorting of materials.

BACKGROUND

Recycling has been an important part to removing waste from the world and prolonging the use of various products for years. The United States has previously relied on Asian countries to recycle its waste. However, recent changes have occurred that have forced the United States to process its own waste, which has caused an immediate overload at recycling centers throughout the country. Due to this immediate overload, recycling costs have increased at a staggering rate and overloaded facilities are forced to dispose of recyclable material in landfills.

Additionally, many facilities still rely on human labor to perform tasks, such as sorting the various recyclables into their proper place. Other facilities have introduced robotic systems with machine vision, with most of these facilities relying on conventional vision techniques. These current machine vision systems cannot distinguish between different materials of similar color, texture, etc. For example, the current machine vision cannot distinguish between white plastic and white paper.

Accordingly, there is a need for a robotic system to quickly and accurately identify and sort recyclables through identifying marks. The present disclosure seeks to solve these and other problems.

SUMMARY OF EXAMPLE EMBODIMENTS

In one embodiment, a method and system for marking and encoding recyclability comprises material identification markers to enable a robotic system with computer vision or machine vision to properly identify and distinguish between various materials. In some embodiments, the material identification markers could include printed marks or symbols to describe the recyclable item or material (e.g., paper, plastic, etc.). The material identification markers may be incorporated into the design of the item, printed on the item or label, etched, or otherwise placed or associated with the item. The material identification markers may vary in size and shape. Further, the material identification markers may be visible or invisible to the human eye. For example, in one embodiment, a material identification marker comprises invisible ink and could be used in large quantities without obstructing the view of the label information of the item or material.

In one embodiment, a method for marking and encoding recyclability comprises encoding information about the composition of recyclable items; storing the information in a database; coupling one or more material identification markers on the recyclable items relating to the composition of the recyclable item; sending the information from the database to a robotic system; and sorting the recyclable item through the machine vision by analyzing the one or more material identification markers on the recyclable items compared to the information in the database.

DETAILED DESCRIPTION OF EXAMPLE EMBODIMENTS

Figure 1:
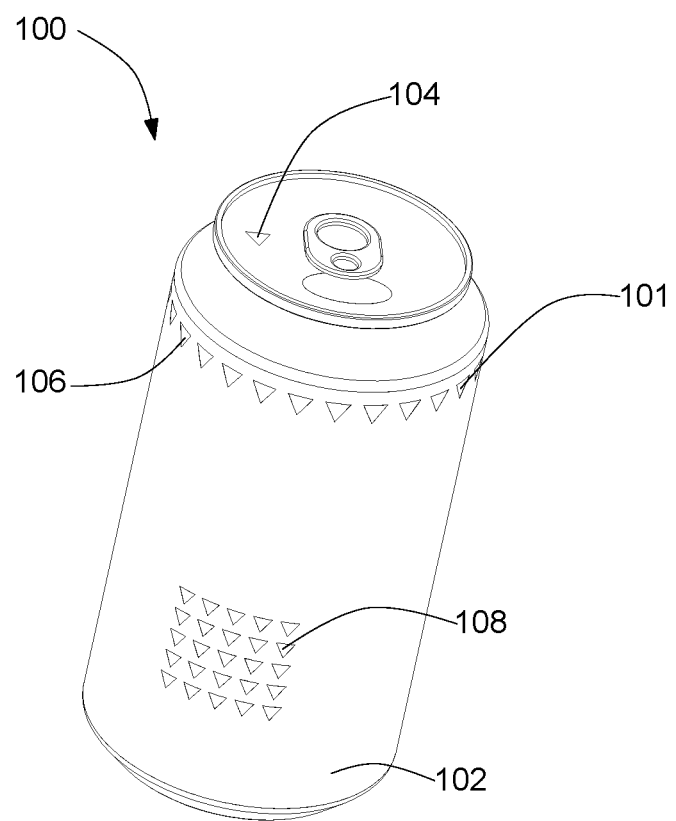
FIG. 1 illustrates a top, front perspective view of an item with various configurations of material identification markers positioned thereon.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need for a robotic system to quickly and accurately identify and sort recyclables through identifying marks. The method and system of marking and encoding described herein seeks to solve these and other problems using material identification markers.

Many recycling facilities rely on robotic systems with conventional machine vision. These conventional vision techniques utilize cameras to analyze products, such as bottles, so that computer software can determine the type of product. However, these current machine vision systems are limited and cannot distinguish between different materials of similar color, texture, shape, etc.

The method and system of marking and encoding described herein will greatly increase the ability of robotic systems (i.e., computer controlled sorters) with machine vision/computer vision to quickly and accurately identify and sort recyclables. The method involves placing a material identification marker on a recyclable item that a machine system may analyze (such as by using machine vision, processors, databases, etc.), and sorting the items based upon the material identification marker. It will be appreciated that the method and system of marking will automate and make cost-effective a process that currently relies primarily on human labor. The recyclable item could have a single material identification marker, multiple material identification markers wrapped around the body of the item, an array of material identification markers, or any other marker configuration. Any manufacturer of consumer products could apply the material identification markers to the outside surface of their product, ensuring that when it is disposed of it can be recycled properly. The system may also enable automated systems to be faster and more accurate than humans, thereby increasing the amount of recyclable material that is processed for recycling and decreasing the amount of product placed in landfills.

Figure 2:
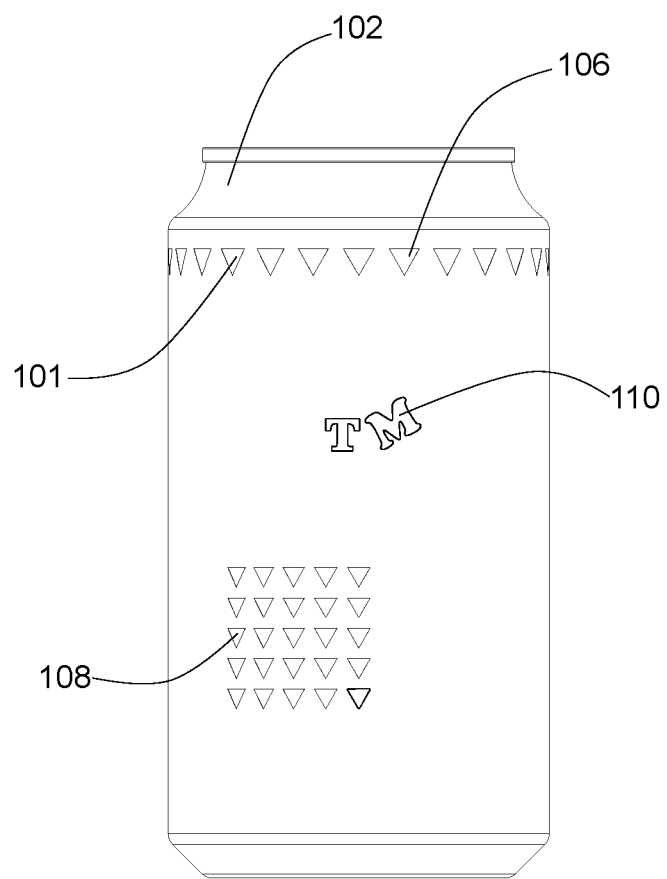
FIG. 2 illustrates a front elevation view of an item with various configurations of material identification markers positioned thereon.

Referring to FIGS. 1-2, in one embodiment, a method and a system for marking and encoding recyclability 100 comprises material identification markers 101 (e.g., printed symbols) to enable a robot with computer vision or machine vision to properly identify and distinguish between various materials. In some embodiments, the material identification markers 101 could include marks or symbols to describe the recyclable item 102 or material. For example, the triangle-shaped material identification markers 101 may indicate an aluminum can; a circle could indicate papers; a square could indicate plastics; etc. It will be appreciated that the foregoing shapes are just examples of use and are not to be considered required or limiting in any way. Additionally, geometric shapes are not required, and other symbols may be used, including QR codes, bar codes, or other encoded symbols. Additionally, while the item 102 shown is a soda can, it will be appreciated that the item may be any recyclable item or material, such as glass, plastic, or paper. The material identification markers 101 may be incorporated into the design of the item, printed on the item or label, etched into the item, or placed in any way capable of being read by the scanner/vision sensors. The material identification markers 101 may vary in size and shape, or type. Further, the material identification markers 101 may be visible or invisible to the human eye. For example, in one embodiment, a material identification marker may comprise invisible ink detectable by machine vision but indetectable to the human eye. By utilizing invisible ink, the label information is not obstructed. This may be especially important where the item is small, lacks insufficient label space, or the manufacturer simply wants to avoid adding additional symbols visible to the consumer. Any invisible ink known in the art may be used, so long as it is machine readable. For example, it may remain invisible until exposed to ultraviolet light, which would allow the camera to capture the symbol. However, other invisible inks may be used as well, such as those that react to heat, chemicals, etc.

In some embodiments, as shown in FIG. 1, the item 102 may comprise a single material identification marker 104 or multiple material identification markers 106, which would ensure that the readable material identification markers are always exposed to the view of the machine vision sensors (e.g., cameras or scanners). In other words, the markers 106 may be printed around the entire circumference of an item 102, allowing the vision sensor to read the material identification markers 106 regardless of orientation of the item 102 on a conveyor. Material identification markers may be applied to multiple locations on the item 102, thereby ensuring that the system 100 can detect each item as it passes under the vision sensors. Additionally, in some embodiments, the material identification markers 101 may be configured in an array 108 or other group of material identification markers. While numerous configurations of material identification markers are shown on the same item, it will be appreciated that the one or more material identification markers 101 may be placed in a single configuration on an item.

Figure 3:
FIG. 3 illustrates trademark variations as material identification markers.
Figure 4:
FIG. 4 illustrates a trademark as a material information marker with data encoded therein.

Furthermore, referring to FIGS. 2-4, in some embodiments, a company's trademark or logo 110 may be used as the material identification marker. As shown, the trademark 110 may vary in font, scale, spacing, color, or even location on the item (e.g., top, middle, bottom of an item). In some embodiments, as shown in FIG. 4, the data may be embedded inside the trademark. The data may be words, colors, symbols, shapes, etc. A subtle variation in the trademark 110 (e.g., color, font, size, etc.) may indicate to the robotic system the type of item 102 or material from which it is made or may recognize the trademark and the type of recyclable associated with the trademark 110. Significant amount of data may be incorporated into variations of the existing trademark, which may also utilize invisible ink. The trademark 110 may be uploaded into a database and used without modification. It will be appreciated that other non-visual types of sensors and non-visual types of material identification markers, tags, grids, arrays, combinations, proximities, etc. could be implemented without departing herefrom.

Figure 5:
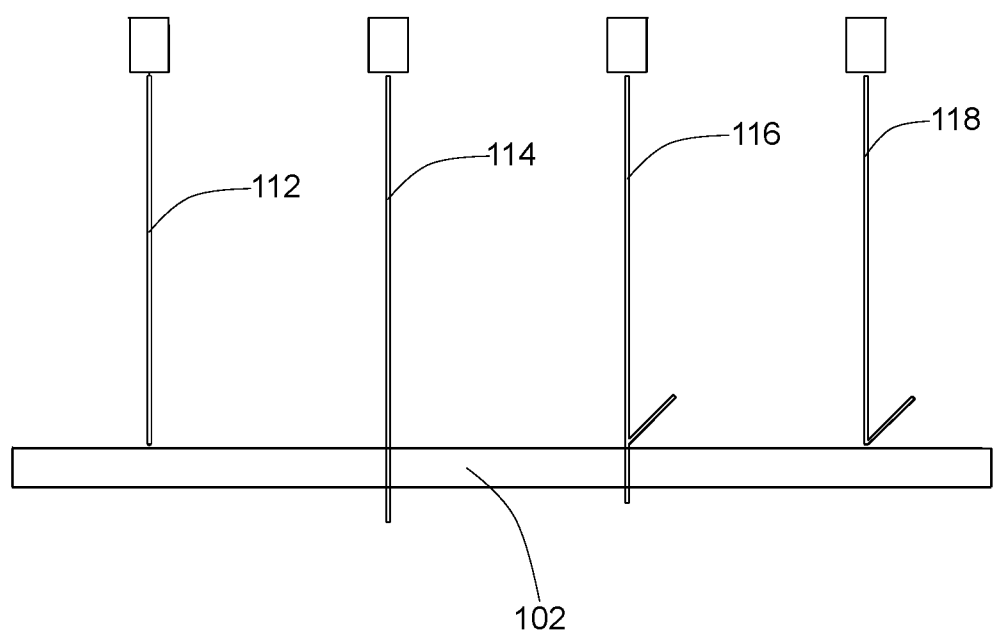
FIG. 5 illustrates various light beams interacting with an item.

The item 102, in some embodiments, may be radiated by various wavelengths or frequencies to produce a heat signature. The computer vision system may combine data from various types of sensors, such as audio, chemical, UV, thermal, and/or capacitive to identify the item 102 and its material composition. For example, as shown in FIG. 5, a first beam 112 (e.g., light or laser) or emissions may be absorbed by the item 102. Alternatively, a second beam 114 or emission may pass through the material of the item 102. A third beam 116 or emission may partly absorb and partly scatter or reflect, while a fourth beam 118 or emissions may completely reflect from the surface of the item 102. It will be appreciated that the material (e.g., plastic, glass, paper, etc.) of the item 102 is determined by whether the beams absorb, partially absorb, or reflect. Sound wavelengths and their reactions, chemical reactions, or other indicators may also be used to ascertain the material composition. This allows a machine (e.g., robot and associated sensors and processors) to determine the item composition and sort it accordingly without human intervention.

Figure 6:
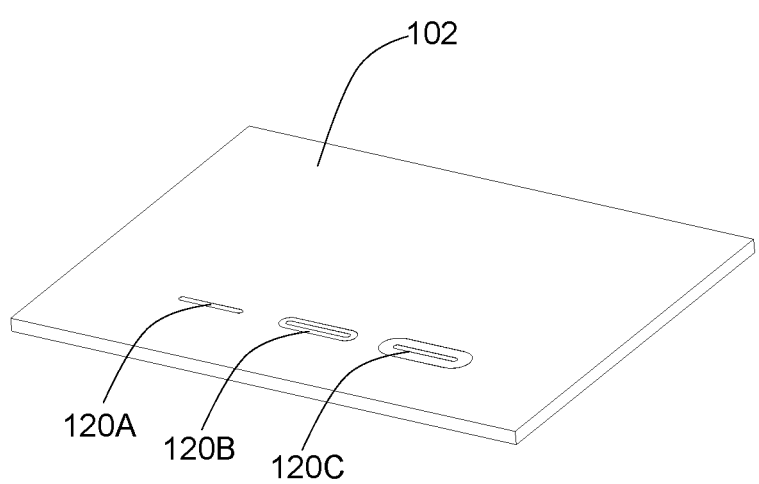
FIG. 6 illustrates a top perspective view of material identification markers on an item.
Figure 7:
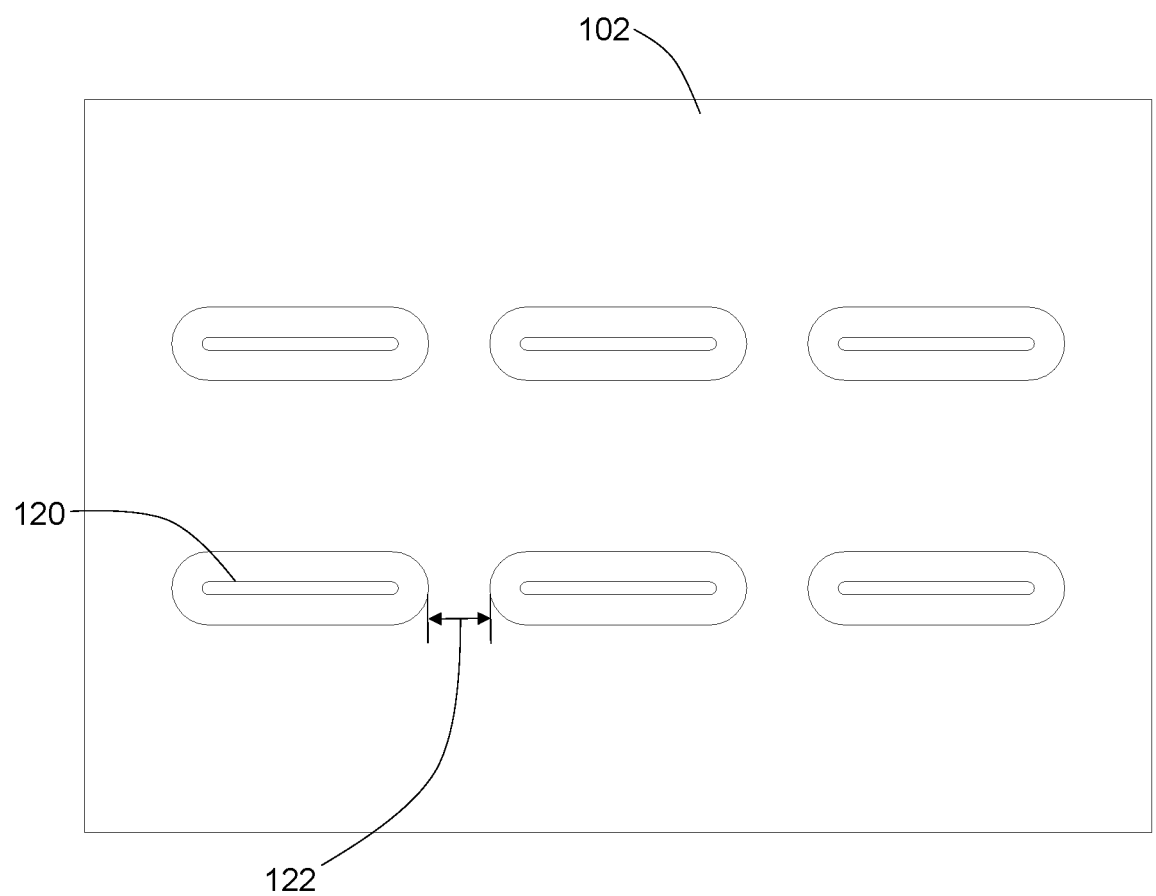
FIG. 7 illustrates a top plan view of material identification markers on an item.
Figure 8:
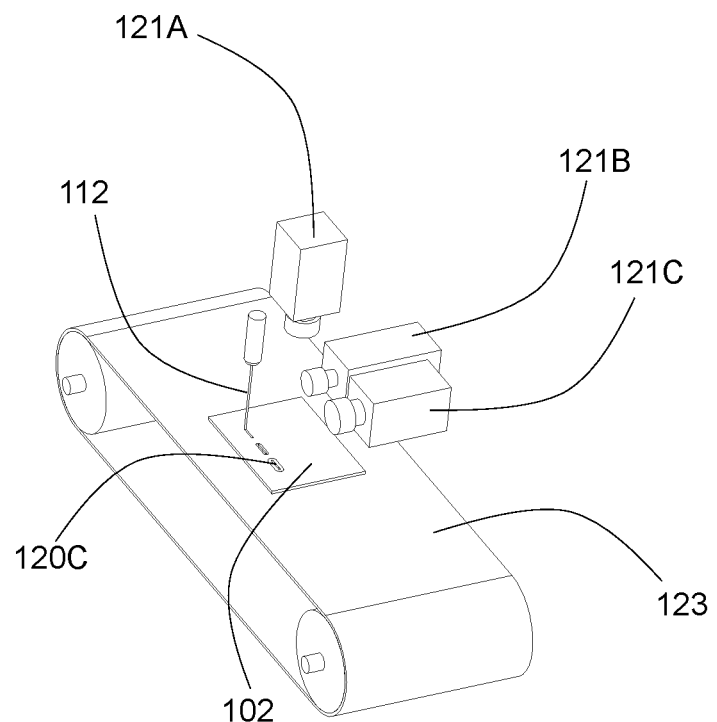
FIG. 8 illustrates a portion of a robotic system identifying compositions using material identification markers or processes.
Figure 9:
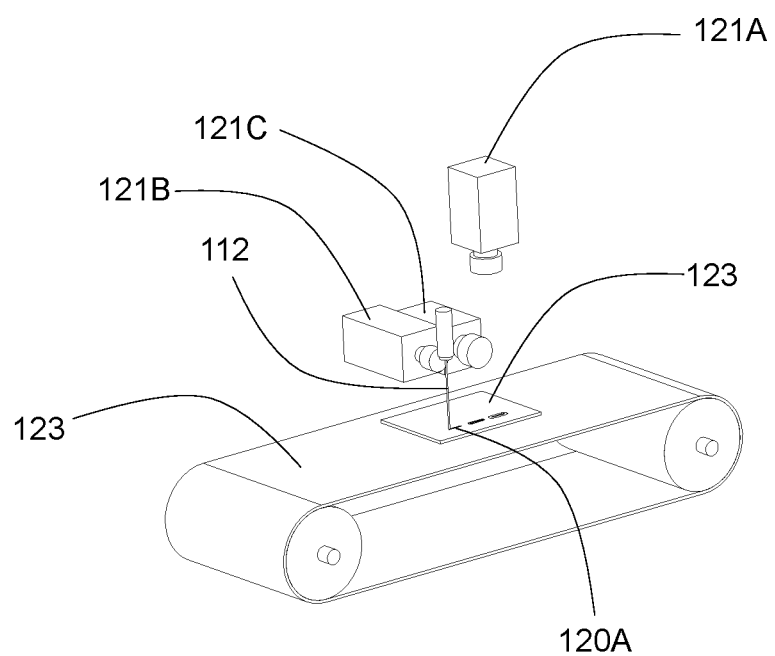
FIG. 9 illustrates a portion of a robotic system identifying compositions using material identification markers or processes.

Referring to FIG. 6, in one embodiment, line indicators 120A, 120B, 120C may cover a specific area of the item 102, which may be heated or otherwise affected by the radiation or emission described above. The surface area of the line may vary (e.g., comparing 120A, 120B, 120C), which allows the sensors to identify the material composition based on surface area change. In other words, one type of material may produce a larger line 102C while another material may produce a smaller line 120A. In particular, line indicators 120 could be viewed by a camera or thermal sensor 121A, 121B, 121C (FIGS. 8-9) to assess thermal displays by measuring heat-affected zones. For example, as shown in FIG. 7, the distance 122 between the line indicators 120 may be measured after being subjected to heat. The calculated distance 122 will fall within a predetermined range for different materials. For example, the distance 122 will be different for plastics and metals, allowing the two to be distinguished. The item 102 or material could be identified after analyzing the measurement (i.e., the distance 122 between the line indicators 120) and comparing to a database. As shown in FIGS. 8-9, a conveyor 123 conveys an item 102 for recycling. A laser 112 applies heat to one or more line indicators 120A-C as the item 102 is conveyed. The distance between the heat-affected line indicators is measured (FIG. 7) using the cameras or thermal sensors 121A-C. Once the distance is ascertained, it is compared to a database having information correlating to the material type. Upon determining the type of material (e.g., plastic, paper, etc.), the item 102 is then sorted using methods known in the art of sorting, such as sorting arms, robot arms, robot grippers, etc. In another example, instead of measuring the distance between line indicators, a single line may be heated and compared with the heat-affected zone, where the thermal conductivity may then be compared against ranges stored in a database. In yet another example, smoke resulting from applied heat (laser, torch, fire, etc.) may be analyzed for color, opacity, etc. such as by using a spectrometer, multi-spectral, or hyperspectral camera. A hyperspectral camera can also detect a heat signature, allowing it to be used for multiple methods of detection. By heating, burning or vaporizing a portion of the item 102, a very in-depth analysis could be made by viewing the resulting vapor, smoke, heated zone, etc. with the wideband/hyperspectral camera. Any flame produced by the beams 112-118 or emission may be analyzed. Items might be illuminated or excited by using various types of light, radiation, sound, etc. and caused to emit identifiable light, sound, heat, etc. Additionally, in one embodiment, a handheld or versatile device may scan any of the material identification markers, allowing an individual to scan the items if needed.

Figure 10:
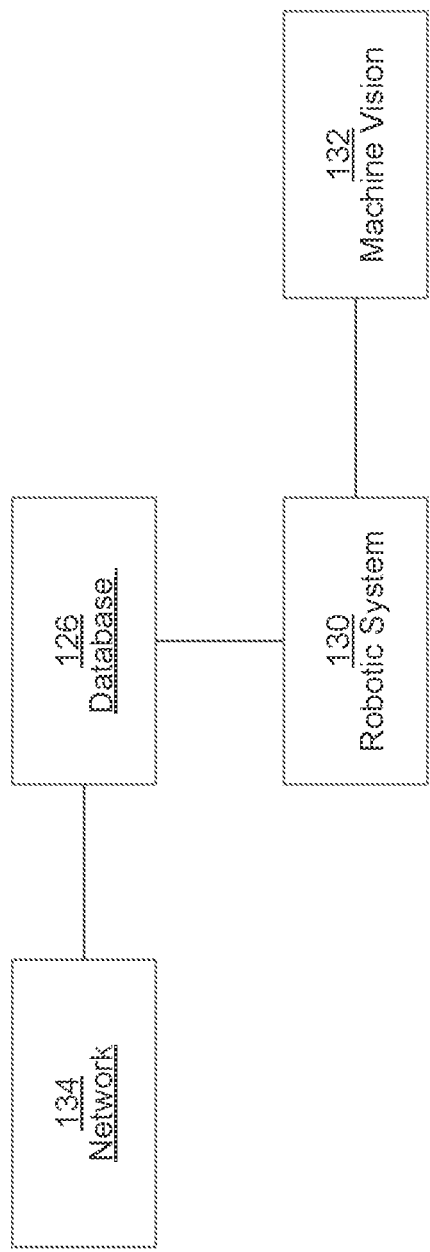
FIG. 10 illustrates a block diagram of a database and a robotic system of a system for marking and encoding recyclability.

As shown in FIG. 10, a database 126 may comprise stored information and be in direct communication with a robotic system 130 (e.g., computer-controlled sorter), which sorts the recyclable items via, for example, high-speed diverter sorting arms, robot grippers, etc. The database 126 may contain the numerous material identification markers and their corresponding material classification (e.g., paper, plastic, glass, etc.) or other type of information (collectively the "stored information") about the composition of common types of recycled items. The stored information may be programmed into the robotic system 130 in advance by a user. Further, it will be appreciated that the robotic system 130 may have the ability to scan a sample of a recyclable item (e.g., to retrieve information relating to product material) to create a profile in the database 126. This allows the robotic system 130 to begin classifying (or flagging for user review) unknown materials (i.e., items/materials not having a corresponding entry in the robotic system 130). The robotic system 130 uses vision sensors 132 (machine vision, computer vision, barcode scanners, thermal sensors, etc.) to identify and sort various recyclable materials at a high rate of speed and with a high degree of accuracy. In one embodiment, the machine vision 132 may use an assortment of cameras to scan and analyze the material identification markers. Alternatively, other types of scanning systems may be implemented without departing herefrom, as described above.

It should be noted that the encoded visual or other type of information, such as color, texture, shape, trademark, or any combination, may be in the stored information in the database 126. In particular, the information may be stored in the database 126 and sent to the robotic system 130, which can analyze the material identification markers on the items 102 and sort the items 102 properly using sorter arms or other sorting machines/methods. In such a scenario, the robotic system would comprise microcontrollers or other processors capable of processing and comparing the data and executing pre-programmed instructions based upon the processed data. Additionally, the database 126 may be continually updated with new information, for example, from business owners regarding their trademark or their products. Further, manufacturers may update the system with minor variations in recyclable items during production runs to ensure that the system is able to properly identify the recyclable items when recycled. In particular, the database 126 may be updated via a network 134, such as the internet. In other words, the database 126 may be an internet-connected database, allowing companies to update material identification markers on their products. The network 134 may allow any company to upload information to the database 126 so as to increase the identifying and sorting effectiveness of the robotic system 130. Additionally, the recycler may also program the robotic system and/or database 126 to recognize items that pass through its facility. Again, this information may be color, shape, material identification markers, trademark location, size, or shape, among others.

In one embodiment, the robotic system 130 may gather and record data autonomously. For example, the robot system 130, via computers, microcontrollers, cameras, sensors, and other components, may detect material compositions of items not yet stored in the database 126, and, based upon comparing data, may automatically classify a material type and store it in the database for future use. For example, the robotic system 130 may determine that a box the size and shape of a standard cereal box, although currently unclassified (not found in the database), is made from cardboard based upon similar classifications that are in the database (e.g., other brands of cereal boxes that are classified). The larger the database 126, the better the robotic system 130 becomes at identifying previously unknown items 102. Accordingly, the robotic system 130 equipped with machine vision 132 could greatly enhance the ability to identify and sort recycled items. Additionally, robotic systems 130 from multiple processors may be in network communication, allowing the sharing of information. In other words, if a user programs a new material/composition/symbol into a database for the robotic system at location A, a robotic system at location B may likewise retrieve the information, allowing a rapid growth and expansion of known products and materials. As a result, the database grows quickly, allowing for the robotic system to be very efficient. Additionally, a correction by one user at location A (e.g., correcting a miscategorized product) may also update other locations.

While the stored information in the database 126 may be sent to, and analyzed by, the robotic system 130, it may also be sent to the database 126 for processing, which may be offsite. For example, once the robotic system 130 with machine vision 132 scans a material identification marker (e.g., 101), the robotic system 130 may transmit the information (through a wireless or wired connection) to a database 126 capable of processing the received information, comparing it against the information stored in the database, and sending one or more instructions back the robotic system 130 for action, such as the type of material identified and how to sort the item. The processor may then process the information, comparing the received signal with the stored information, and send a signal back to the robotic system with information directing the robotic system on how to sort the recyclable item 102. For example, the robotic system 130 may identify a marker 101 on an object 102 (via a scanner, camera, etc.), send the information programmed in the marker to the database 126 for processing, the database 126 may process and locate the corresponding marker in the database to identify the material type (e.g., glass), and send instructions to the robotic system 130 to sort the material to a receiving bin on the right side, in a non-limiting example, of the conveyor, which corresponds to glass.

The database 126 and/or processor at the robotic system 130 may be a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the marking recyclability system 100.

Further, computer program code for carrying out operations for aspects of the present disclosure may be written in any combination of one or more programming languages, including, but not limited to, an object oriented programming language such as Java, Scala, Smalltalk, Eiffel, JADE, Emerald, Objective-C, C++, C#, VB.NET, Python or the like, conventional procedural programming languages, such as the "C" programming language, Visual Basic, Fortran 2003, Perl, COBOL 2002, PHP, ABAP, dynamic programming languages such as Python, PHP, HTML, AJAX, Ruby and Groovy, or other programming languages such as X-Code. The program code may execute entirely or partially on one or more of the devices of the system, including on the robotic system 130, the database 126, or another network-connected device.

In one embodiment, the database 126 may be updated by, or for, the manufacturers via a subscription to the service. As an example, newly created material identification markers 101 may be uploaded through the network 134 to the database 126 so as to promote accurate sorting of all recyclable items. Alternatively, the manufacturers may create a specific label bearing a material identification marker for each material so as to create a uniform marking system. Other material identification markers may include proprietary textures, shades, color combinations, physical features, or existing QR codes and Barcodes may be utilized. In some cases, the original logo may be sufficient to use as a material identification marker. The robotic system 130 may be programmed to identify an existing trademark or brand. Some brands only have a limited number of possible materials and would only require registering with the system.

Figure 11:
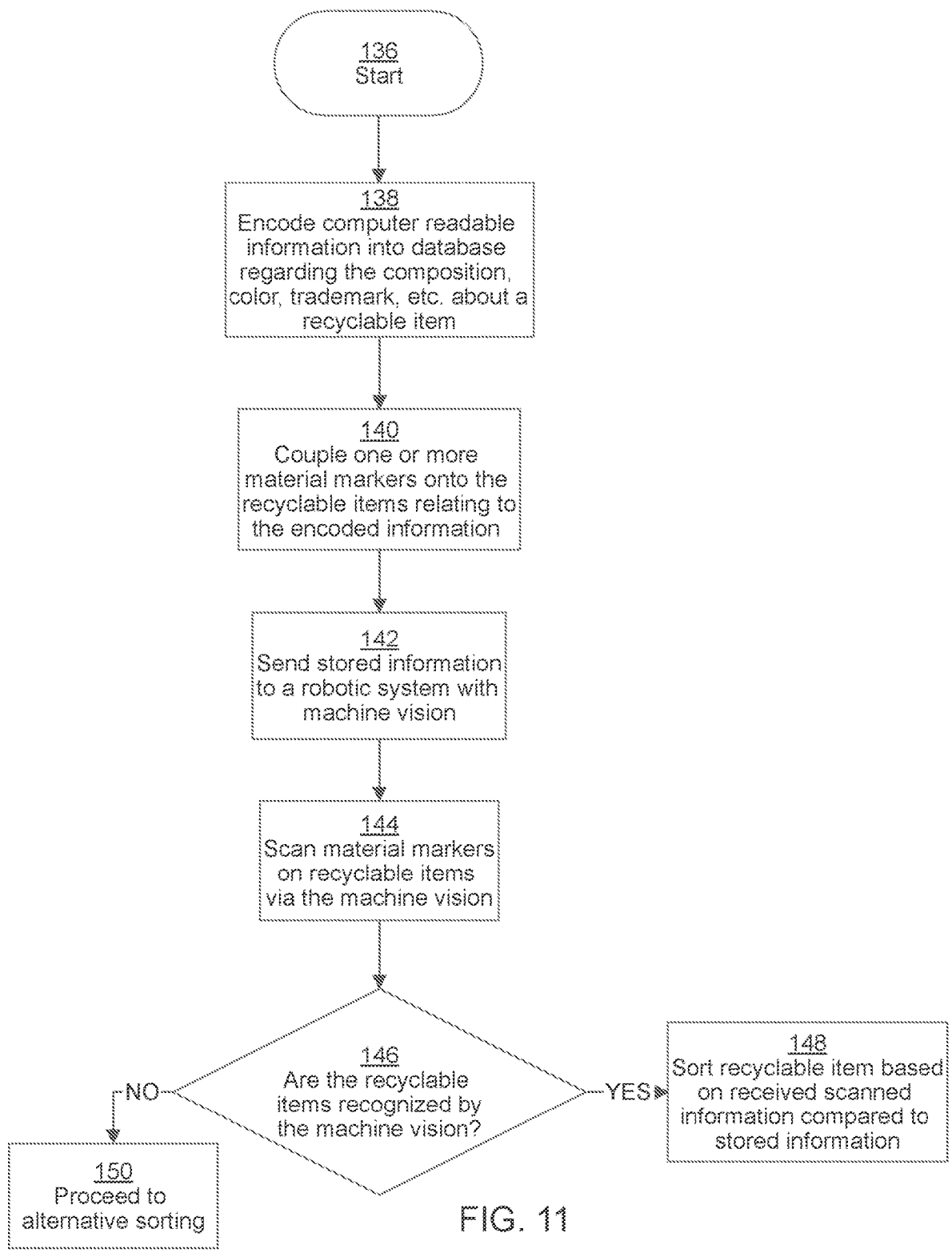
FIG. 11 illustrates a flowchart of a method of marking and sorting recyclable items.

FIG. 11 illustrates, in one embodiment, a system and method of sorting recyclable items based upon material identification markers. The system starts at step 136. Computer readable information about a material identification marker and its associated material composition (e.g., paper, plastic, etc.) is encoded (inputted and stored) in a database at step 138. At step 140, one or more material identification markers (corresponding to those in the database 126) are coupled to the recyclable items, the material identification markers. At step 142, the stored information is sent to a robotic system having machine vision, computer vision, cameras, scanners, or other systems capable of reading/identifying a material identification marker. Material identification markers on the recyclable items are then viewed/scanned via the machine vision at step 144. At step 146, the system determines whether the recyclable items are recognized by the machine vision. If the items are recognized (e.g., a material identification marker is detected by the robotic system, marker and accompanying material type identified in database), then at step 148, the recyclable item is sorted based on the received scan information that is compared to the stored information in the database. For example, the robotic system uses a camera lens to map the environment, whereupon a material identification marker is detected. The information encoded in the material identification marker is then processed by the robotic system (either locally or via a network) and compared to the data in the database 126. Upon finding a match in the database (e.g., a material identification marker defines the item 102 as being made from aluminum), instructions (pre-programmed actions) are sent to a sorter to sort the item 102 into an aluminum bin. This may be accomplished using standard sorting systems known in the art, robot grippers, or other known sorters. If the recyclable items are not recognized by the machine vision (e.g., material identification marker not found or detected), then at step 150 the system proceeds to alternate sorting. It will be appreciated that alternate sorting may include sorting by human beings or other types of scanning or computer-controlled sorters.

Figure 12:
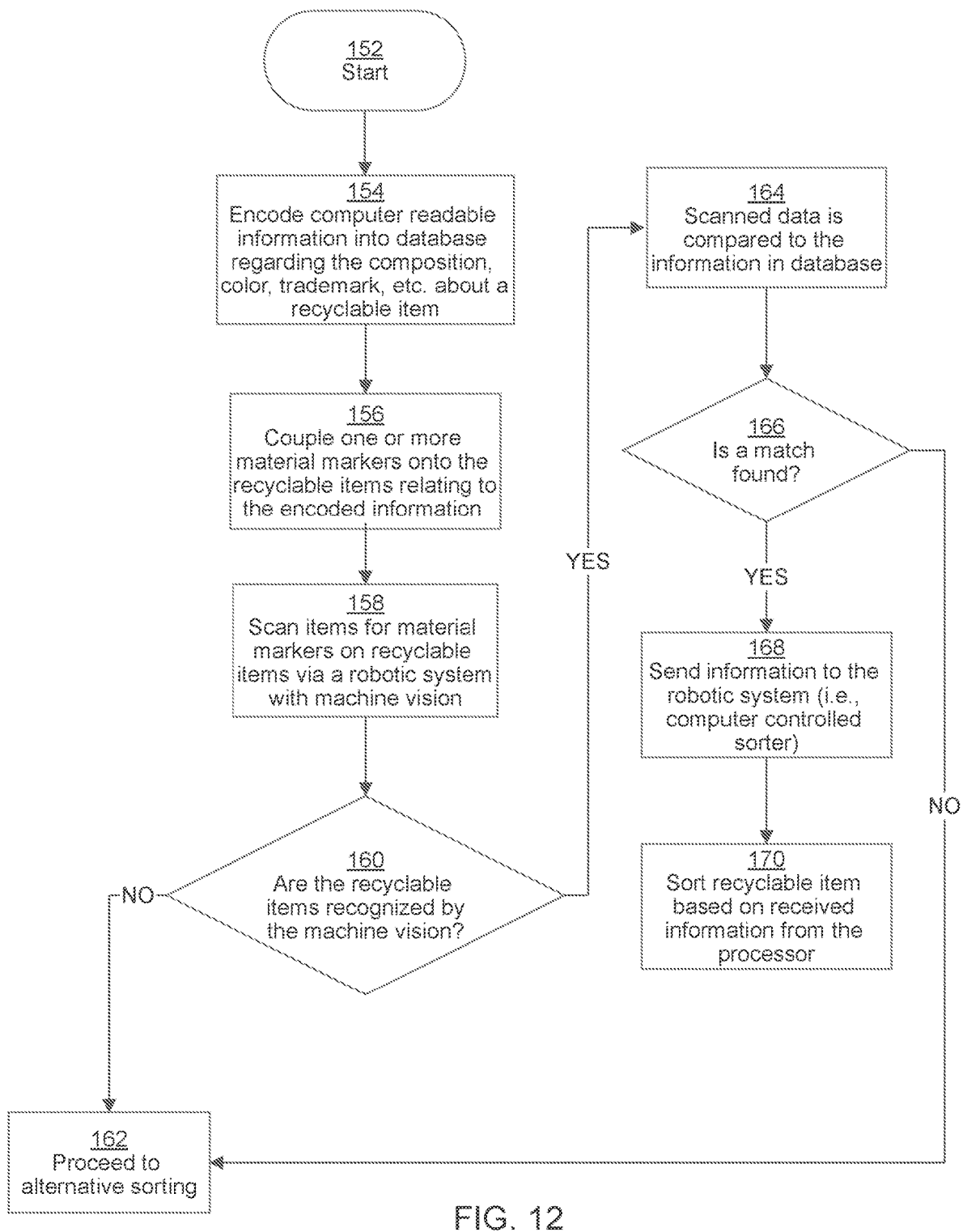
FIG. 12 illustrates a flowchart of a method of marking and sorting recyclable items.

Referring to FIG. 12, in one embodiment, a system and method of sorting recyclable items based upon material identification markers comprises starting the system at step 152. Computer readable information about the composition, color, trademark, etc. of recyclable item is encoded in a material identification marker and stored in a database at step 154. At step 156, one or more material identification markers are coupled to the recyclable items, the markers relating to the encoded information concerning the composition, color, etc. At step 158, the robot system scans/views items to identify material identification markers on the recyclable items. It will be appreciated that other imaging and analysis techniques may be used to sort the recyclable items by the robotic system, not just scanning or cameras, but lights, lasers, or methods discussed earlier herein.

At step 160, it is determined whether the item comprises a material identification marker (sometimes referred to as a "material marker" for conciseness), which, as described above, may have been entered or scanned into the database. If no material identification marker is found, the item proceeds to alternate sorting in step 162. If a material identification marker is found, then the system continues in step 164 by sending the information received from the material marker to the database for processing and comparison. The database and the processor may be on-site or remotely located and may be one device or multiple devices. In one embodiment, the database is a server. Further, the scanned information may be sent through a wired or wireless connection to the database and processor. At step 166, the system determines whether the material identification marker is found in the database (e.g., is there information in the database to instruct the sorter?). If no corresponding material identification marker is found in the database or there is no information associated with the marker in the database, then the system continues to step 162 for alternate sorting. It will be appreciated that alternate sorting may include sorting by human beings or other types of scanning or computer-controlled sorters. Further, in some embodiments, a recyclable item that continually proceeds to alternate sorting may be flagged, inspected, and given a material marker to be manually entered or scanned into the database so that manual sorting in the future is not required. If a corresponding match to the material identification marker is found in the database, then at step 168, sorting instructions (pre-programmed actions/steps) are sent to the robotic system 130 to sort the items, where, at step 170, the recyclable items are sorted based on the received information from the database/processor. In some embodiments, particularly where a QR code or other symbol may be encoded to contain computer-readable information, transmitting to a database 126 may not be needed. For example, a material identification marker may comprise computer readable information about the composition, color, trademark, etc. of recyclable item. Upon scanning the material identification marker, the system may process the instructions received from the encoded computer-readable information (much like a QR code has encoded information and does not require connectivity to a network or database to retrieve encoded information therein).

Figure 13:
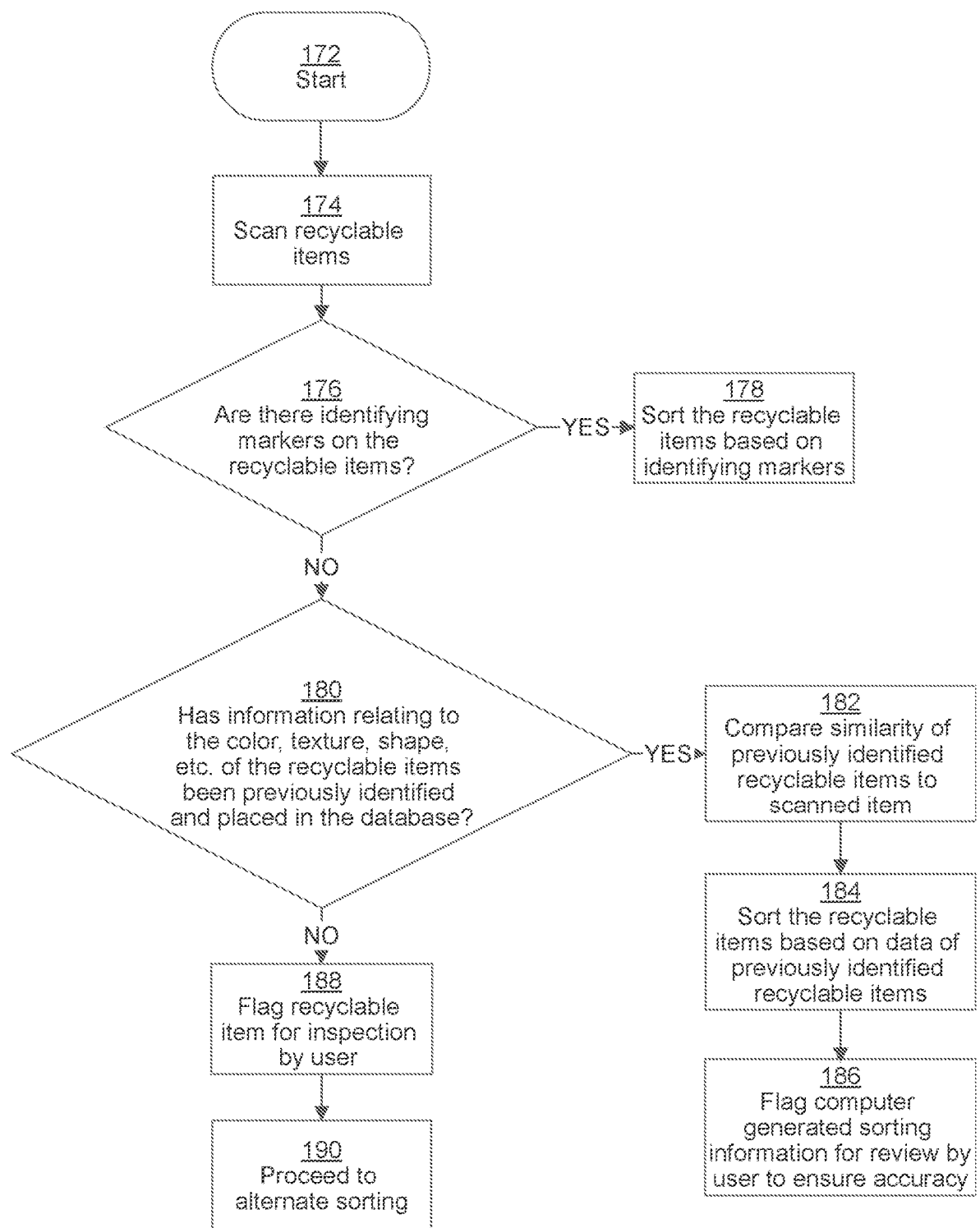
FIG. 13 illustrates a flowchart of a method of marking and sorting recyclable items.

Referring to the flowchart in FIG. 13, the system starts at step 172. Then at step 174 the recyclable items are scanned by the robotic system 130 as they proceed down the conveyor belt. At step 176, the system determines whether there are identifying markers on the recyclable items. If there are identifying markers on the recyclable items, then, at step 178 the items are sorted based upon the identifying markers and the information in the database. If there are not identifying markers, at step 180, the system determines whether there is information relating to the color, texture, shape, etc. of the recyclable items which have been previously identified and placed in the database (e.g., has an item of similar size, shape, color, etc. been previously identified?). If yes, at step 182, the similarity of the previously identified recyclable items and the scanned items are compared. At step 184, the recyclable items are then sorted based on the data of previously identified items, which has been stored in the database. In other words, if several attributes (e.g., color, size, shape, weight) are in common with a previously inputted item (e.g., cereal box), the computer may automatically categorize the unknown item as a cereal box as well. To ensure accuracy of sorting items, the computer flags the newly generated sorting information to be reviewed by a user at step 186. It will be appreciated that step 186 is not required, and the system may rely on the information regarding the previously identified items. Returning to step 180, if there is not information on the color, texture, shape, etc. of the recyclable items, then at step 188 the recyclable item is flagged for inspection by the user. The item is then sorted via alternate sorting methods at step 190. In some embodiments, the user may upload information relating to the unidentified recyclable item so as to increase sorting accuracy of the system.

The robotic system may also record logs for the material that it categorizes, which allows a facility to determine the amount of any given material passing through the facility.

While the foregoing disclosure focuses mainly on the identification of materials/compositions for recycling, it will be appreciated that the systems disclosed herein may also be used in other industries without departing herefrom. For example, instead of identifying materials for recycling, the system may detect other materials/substances/compositions for sorting for other purposes, such as precious metals and stones, or other items. Accordingly, the methods described herein, including computer vision, thermal imaging, and others, may be used to identify and sort materials for a number of purposes.

It will also be appreciated that systems and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A method of sorting recyclables, comprising:
   encoding information about the composition of recyclable items and storing that information in a database;
   sending the information from the database to a robotic system;
   applying heat, radiation, or emissions to one or more line indicators on the recyclable items;
   sorting the recyclable items via machine vision of the robotic system by analyzing the one or more line indicators on the recyclable items and comparing the one or more line indicators with the information in the database.

2. The method of claim 1, wherein the one or more line indicators are invisible to the human eye.

3. The method of claim 1, wherein the one or more line indicators comprise a plurality of line indicators positioned at various locations on the recyclable item.

4. A system for marking and sorting recyclables, comprising:
   recyclable items each comprising one or more line indicators;
   a database in communication with a robotic system, the robotic system comprising machine vision to identify and sort recyclable items;
   wherein the database comprises stored information about the composition of the recyclable items;
   wherein when the one or more line indicators are measured and compared to the database using the machine vision of the robotic system, the recyclable items are sorted based upon the retrieved measurement and stored information in the database.

* * * * *